United States Patent Office 2,769,799
Patented Nov. 6, 1956

2,769,799

POLYAMINE MODIFIED MELAMINE RESINS

Tzeng Jiueq Suen, New Canaan, and Yun Jen, Stamford, Conn., assignors to American Cyanamid Company, New York, N. Y., a corporation of Maine No Drawing. Application March 20, 1953,
Serial No. 343,791

18 Claims. (Cl. 260—67.6)

This invention relates to resinous compositions and to the process of preparing the same. More particularly this invention relates to the production of resinous compositions which comprise reacting melamine, formaldehyde and a polyfunctional aliphatic polyamine.

Melamine-formaldehyde resinous compositions are well-known in the art. Resinous compositions comprising solely melamine and formaldehyde as well as those compositions containing melamine, formaldehyde and a modifying component find many uses. The use of melamine resins in making a wet strength paper has been known for a number of years. One of the usual practices is to dissolve the melamine-formaldehyde resin in a dilute hydrochloric acid solution and age it for a certain length of time. During this period the resin is further polymerized and the so-called acid colloid is formed. The acid colloid is infinitely water-soluble and is a very effective beater additive for paper. However, it is not stable and must be prepared by this aging process just prior to use.

Besides the acid colloids, other forms of water-soluble melamine resins are known; for instance, methylated polymethylol melamine and bisulfite modified melamine-formaldehyde resin. The methylated product has a low degree of polymerization and is not generally effective as a beater additive although it finds other uses in such applications as in textile treatment and laminating processes. The bisulfite modified product while far inferior to the acid colloid finds some use in making wet strength paper.

We have found that by reacting melamine, formaldehyde and a water-soluble polyfunctional aliphatic polyamine in the presence of an acid, stable water-soluble but highly polymerized products are obtained which can be added directly to the pulp stock as an efficient wet strengthening agent for paper through beater addition. The resinous composition prepared can also be used in textile treatment and in leather treatment. Other uses such as for a water-soluble adhesive and as an insolubilizing agent to starch are possible.

It is an object of this invention to produce a water-soluble resinous material. It is a further object of this invention to prepare a resinous material comprising melamine, formaldehyde and a polyfunctional aliphatic polyamine. These and other objects will be discussed more fully hereinbelow.

In the preparation of the resinous material the order of addition of reactants is not important. For instance, melamine and formaldehyde can be condensed first at neutral or slightly alkaline pH. Thereafter the modifier is added and the mixture subsequently acidified. Polymerization proceeds rapidly in an acidic medium. As soon as the desired degree of polymerization is reached, the polymerization reaction is halted by neutralization of the reaction mixture. Alternately, the modifier can be first reacted with formaldehyde then melamine charged into the reaction mixture. Still another way of preparation is to charge melamine, formaldehyde and the modifier all together at a pH in the order of from about 4.5 to about 6.5 and the polymerization carried out to the end. The end point of the polymerization is best controlled by viscosity measurements of the resin syrup. At 35% resin solids a minimum viscosity of 20 centipoises measured at 25° C. must be reached before the reaction is stopped. There is no upper viscosity limit to which the resin should be polymerized but for practical purposes a viscosity at 25° C. above 800 centipoises at 35% solids has been found to unduly shorten the storage life of the resin. The preferred viscosity range of the finished syrup measured at 25° C. and at 35% solids is from about 30 to about 500 centipoises. Furthermore, the reactants can be added in portion at different points of reaction, for example, a part of formaldehyde can be first reacted with melamine, the modifier charged, and the remaining formaldehyde added after the reaction mass has been highly polymerized.

Generally the lower the pH of the reaction mixture the faster is the rate of reaction. We have found that the reaction can be carried out at a pH range of from about 1 to about 10 with the preferred range being from 2 to 7. The most suitable pH, however, depends on the particular compositions used. In general with a greater amount of formaldehyde a lower pH should be used. With the polyfunctional aliphatic polyamine in the reaction mass a lower pH may be used.

Temperature of reaction can be in the range of from room temperature up to the reflux temperature of the mix. If an autoclave is used in carrying out the reaction, even higher temperatures may be employed. The preferred temperature range is from about 20° C. to about 100° C. at atmospheric pressure.

In order that those skilled in the art may more fully understand our inventive concept the following examples are set forth for purposes of illustration only, unless otherwise indicated in the appended claims. All parts used are parts by weight.

*Example 1*

63 parts of melamine, 324 parts of formalin (37% aqueous formaldehyde) and one part of triethanolamine are charged into a suitable reactor equipped with agitating, heating, cooling and refluxing devices. The pH of the mixture is about 7.7. The mixture is then heated to about 80° C. and held at this temperature for about 20 minutes. At this point 52.8 parts of 68% ethylene diamine is added followed by 40 parts of 50% formic acid. As the reaction is exothermic, cooling should be applied. The pH of the reaction mixture after the addition of the acid is about 3.5. The reaction is allowed to continue at about 70° C. for 15 minutes. The solution is then cooled to and maintained at about 25° C. while the viscosity of the syrup gradually increases. When the Gardner Holdt viscosity of E is reached measured at 25° C., the reaction product is neutralized with dilute sodium hydroxide solution. The resin syrup is stable on storage and infinitely soluble in water. Its stability may be further improved by introducing an additional amount of formalin, for example, 81 parts, into the product.

*Example 2*

63 parts of melamine and 324 parts of formalin (37% aqueous formaldehyde) are mixed in a suitable reactor and the pH of the mixture is adjusted to about 7.6 with 1 part of triethanolamine. The mixture is heated to 80° C. and held at this temperature for 20 minutes. 35 parts of triethylene tetramine and 10 parts of water are added to the reaction mixture and the mixture is then acidified with 50 parts of 50% formic acid. The pH of the mixture is about 2.0. The mixture is cooled quickly to 30° C. in 5 minutes and neutralized with dilute sodium hydroxide solution. The neutralized resin has a pH of 7.00 and a Gardner Holdt viscosity of F–G. It is water-soluble and stable.

*Example 3*

63 parts of melamine and 405 parts of formalin (37% aqueous formaldehyde) are mixed together in a suitable reactor and the pH of the mixture is adjusted to about 7.5 with 1 part of triethanolamine. The mixture is heated to 75° C. and held at this temperature for 30 minutes. A solution of 60 parts of guanidine carbonate in 110 parts of water is added followed by about 86 parts of 50% formic acid and 162 parts of additional formalin. The pH of the reaction mixture is 3.3. Reaction is allowed to continue at about 50° C. for about 2 hours. The product is neutralized with triethanolamine to a pH of 7.0. The viscosity of the syrup is about A–1 on the Gardner Holdt scale. The product contains 24% solids and is very stable and soluble in water in all proportions.

In the practice of the process of our invention it is desirable to use an excess amount of formaldehyde in the reaction mixture. The molar ratio of formaldehyde to melamine should always be greater than 6 to 1 and while no actual upper limit on the molar ratio of formaldehyde to melamine is known a practical upper limit will necessarily be reached. It is preferred that from about 8 mols of formaldehyde per mol of melamine to about 20 mols of formaldehyde per mol of melamine be employed in the preparation of the resinous product. The maximum theoretical mols of formaldehyde that may react with each mol of melamine is 6 to 1. Although the reaction mechanism of the formation of the resin of our invention has not been established, we believe that the excess formaldehyde present in the reaction mass reacts with some of the methylol groups of the resins to form hemi-acetals. This reaction is in accordance with that when a simple alcohol is reacted with formaldehyde. The hemi-acetals formed are comparatively unstable and are the results of reversible reactions and exist only in the form of solutions. Under neutral or alkaline conditions the hemi-acetals appear to be the sole reaction product between formaldehyde and the methylol groups of the resin. Under acidic conditions the hemi-acetals that are first formed are capable of reacting with additional quantities of the methylol groups to yield formaldehyde-acetals or formals. The formation of hemi-acetals or formals seems to improve the solubility as well as the storage stability of the resin syrup.

We have discovered that by reacting a polyfunctional aliphatic polyamine with these melamine formaldehyde reaction products a water-soluble resinous composition of a high degree of polymerization is obtained. The polyfunctional aliphatic polyamines that may be utilized in the production of the resinous compositions are the alkylene polyamines such as ethylene diamine, trimethylene diamine, tetramethylene diamine, propylene diamine (1,2 diaminopropane). Alternatively, we may use such polyalkylene polyamines as diethylene triamine, triethylene tetramine, tetraethylene pentamine, 3,3′ iminobisproplyamine, tris-(3-aminopropyl)amine and the like. Hydroxyl polyamines may also be utilized in the preparation of the resinous material, examples of which are N,N(2-hydroxy ethyl-2′ aminoethyl)amine, N,N(3-hydroxy propyl -3′ aminopropyl)amine and the like. Other polyfunctional aliphatic polyamines which are adaptable for use in the preparation of the resinous composition of our invention are guanidine compounds such as guanidine hydrochloride, guanidine nitrate, guanidine acetate, guanidine carbonate, guanidine, biguanide and the like.

The amount of polyfunctional aliphatic polyamine employed in the preparation of the resinous material may vary over rather wide limits. From about 0.5 atom of basic nitrogen present in the polyfunctional aliphatic polyamine per mole of melamine to about 10 atoms of basic nitrogen present in the polyfunctional aliphatic polyamines per mol of melamine may be used. It is preferred, however, that from about 1 atom basic nitrogen to about 4 atoms basic nitrogen present in the polyfunctional aliphatic polyamine be utilized per mol of melamine present. The particular polyfunctional aliphatic polyamine should be so selected that the carbon to nitrogen ratio present is not greater than 4 to 1. We have found that a carbon to nitrogen ratio greater than this is detrimental to the water-solubility of the resinous product.

Two of the resins prepared as set forth above were tested as wet strength paper resins. Hand sheets are made on a Nash machine with Canadian bleached kraft pulp beaten to a Green freeness of about 500. The solids content of the syrup is determined by the Plastic Materials Manufacturers Association method. The amount of resin applied is either 1 part or 3 parts of resin solids per 100 parts of dry pulp. 1 part of alum is also added. The pH of the pulp slurry is adjusted to 4.5. After the hand sheets are made, they are dried at 220–240° F. for 2 minutes. The test results are set forth in the table below.

TABLE I

| Resin Described in— | Percent Resin Applied | Basis Wt. 25″ x 40″ x 500, Lbs. | Wet Tensile, Lbs./In. |
|---|---|---|---|
| Ex. 1 | 1 | 47.3 | 4.1 |
| Ex. 3 | 3 | 46.0 | 8.8 |
| Blank | None | 47.5 | 0.5 |

Attention is directed to our copending application Serial No. 343,792, filed concurrently herewith, wherein resinous compositions and process of preparing same which comprises reacting melamine, formaldehyde and a polyfunctional aliphatic polyamine condensation product is disclosed and claimed.

We claim:

1. The process of preparing a water-soluble resinous material which comprises reacting melamine, formaldehyde and a polyfunctional aliphatic polyamine at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount greater than 6 mols per mol of melamine, wherein said polyamine has a carbon to nitrogen ratio not greater than 4:1, respectively, and the polyfunctional aliphatic polyamine is present in an amount to yield between about 0.5 and about 10 atoms of nitrogen per mol of melamine, and wherein the product produced is infinitely dilutable in neutralized water at a temperature between about 25° C. and 30° C.

2. The process of preparing a water-soluble resinous material which comprises reacting melamine, formaldehyde and a polyfunctional aliphatic polyamine at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount between about 8 mols and about 20 mols per mol of melamine, wherein said polyamine has a carbon to nitrogen ratio not greater than 4:1, respectively, and the polyfunctional aliphatic polyamine is present in an amount to yield between about 1 and about 4 atoms of nitrogen per mol of melamine and wherein the product produced is infinitely dilutable in neutralized water at a temperature between about 25° C. and 30° C.

3. The process of preparing a water-soluble resinous material which comprises reacting melamine, formaldehyde and an alkylene polyamine at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount greater than 6 mols per mol of melamine, wherein said polyamine has a carbon to nitrogen ratio not greater than 4:1, respectively, and the alkylene polyamine is present in an amount to yield between about 0.5 and about 10 atoms of nitrogen per mol of melamine and wherein the product produced is infinitely dilutable in neutralized water at a temperature between about 25° C. and 30° C.

4. The process of preparing a water-soluble resinous material which comprises reacting melamine, formaldehyde and a polyalkylene polyamine at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount greater than 6 mols per mol of melamine, wherein said polyamine has a carbon to nitrogen ratio not greater than 4:1, respectively, and the polyalkylene polyamine is present in an amount to yield between about 0.5 and about 10 atoms of nitrogen per mol of melamine, and wherein the product produced is infinitely dilutable in neutralized water at a temperature between about 25° C. and 30° C.

5. The process of preparing a water-soluble resinous material which comprises reacting melamine, formaldehyde and a guanidine compound at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount greater than 6 mols per mol of melamine and the guanidine compound is present in an amount to yield between about 0.5 and about 10 atoms of nitrogen per mol of melamine, and wherein the product produced is infinitely dilutable in neutralized water at a temperature between about 25° C. and 30° C.

6. The process of preparing a water-soluble resinous material which comprises reacting melamine, formaldehyde and a hydroxyl polyamine at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount greater than 6 mols per mol of melamine, wherein said polyamine has a carbon to nitrogen ratio not greater than 4:1, respectively, and the hydroxyl polyamine is present in an amount to yield between about 0.5 and about 10 atoms of nitrogen per mol of melamine, and wherein the product produced is infinitely dilutable in neutralized water at a temperature between about 25° C. and 30° C.

7. The process of preparing a water-soluble resinous material which comprises reacting melamine, formaldehyde and an alkylene polyamine at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount of between about 8 mols and about 20 mols per mol of melamine, wherein said polyamine has a carbon to nitrogen ratio not greater than 4:1, respectively, and the alkylene polyamine is present in an amount to yield between about 1 and about 4 atoms of nitrogen per mol of melamine, and wherein the product produced is infinitely dilutable in neutralized water at a temperature between about 25° C. and 30° C.

8. The process of preparing a water-soluble resinous material which comprises reacting melamine, formaldehyde and a polyalkylene polyamine at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount of between about 8 mols and about 20 mols per mol of melamine, wherein said polyamine has a carbon to nitrogen ratio not greater than 4:1, respectively, and the polyalkylene polyamine is present in an amount to yield between about 1 and about 4 atoms of nitrogen per mol of melamine, and wherein the product produced is infinitely dilutable in neutralized water at a temperature between about 25° C. and 30° C.

9. The process of preparing a water-soluble resinous material which comprises reacting melamine, formaldehyde and a guanidine compound at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount of between about 8 mols and about 20 mols per mol of melamine and the guanidine compound is present in an amount to yield between about 1 and about 4 atoms of nitrogen per mol of melamine, and wherein the product produced is infinitely dilutable in neutralized water at a temperature between about 25° C. and 30° C.

10. The process of preparing a water-soluble resinous material which comprises reacting melamine, formaldehyde and an hydroxyl polyamine at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount of between about 8 mols and about 20 mols per mol of melamine, wherein said polyamine has a carbon to nitrogen ratio not greater than 4:1, respectively, and the hydroxyl polyamine is present in an amount to yield between about 1 and about 4 atoms of nitrogen per mol of melamine, and wherein the product produced is infinitely dilutable in neutralized water at a temperature between about 25° C. and 30° C.

11. The process of preparing a water-soluble resinous material which comprises reacting melamine, formaldehyde and 3,3'-iminobispropylamine at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount of between about 8 mols and about 20 mols per mol of melamine and the 3,3-iminobispropylamine is present in an amount to yield between about 1 and about 4 atoms of nitrogen per mol of melamine, and wherein the product produced is infinitely dilutable in neutralized water at a temperature between about 25° C. and 30° C.

12. The process of preparing a water-soluble resinous material which comprises reacting melamine, formaldehyde and triethylene tetramine at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount of between about 8 mols and about 20 mols per mol of melamine and the triethylene tetramine is present in an amount to yield between about 1 and about 4 atoms of nitrogen per mol of melamine, and wherein the product produced is infinitely dilutable in neutralized water at a temperature between about 25° C. and 30° C.

13. The process of preparing a water-soluble resinous material which comprises reacting melamine, formaldehyde and guanidine hydrochloride at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount of between about 8 mols and about 20 mols per mol of melamine and the guanidine hydrochloride is present in an amount to yield between about 1 and about 4 atoms of nitrogen per mol of melamine, and wherein the product produced is infinitely dilutable in neutralized water at a temperature between about 25° C. and 30° C.

14. The process of preparing a water-soluble resinous material which comprises reacting melamine, formaldehyde and N,N-(2-hydroxy ethyl-2' aminoethyl)amine at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount of between about 8 mols and about 20 mols per mol of melamine and the N,N(2-hydroxy ethyl-2' aminoethyl)-amine is present in an amount to yield between about 1 and about 4 atoms of nitrogen per mol of melamine, and wherein the product produced is infinitely dilutable in neutralized water at a temperature between about 25° C. and 30° C.

15. The process of preparing a water-soluble resinous material which comprises reacting melamine, formaldehyde and tetraethylene pentamine at a temperature between about 20° C. and about 100° C. until a viscosity of between about 20 centipoises and about 800 centipoises measured at 35% solids and 25° C. is obtained, thereafter neutralizing said resinous material, wherein the formaldehyde is present in an amount of between about 8 mols and about 20 mols per mol of melamine and the tetraethylene pentamine is present in an amount to yield between about 1 and about 4 atoms of nitrogen per mol of melamine, and wherein the product produced is infinitely dilutable in neutralized water at a temperature between about 25° C. and 30° C.

16. A water-soluble resin obtained by the process of claim 1.

17. A water-soluble resin obtained by the process of claim 2.

18. A water-soluble resin obtained by the process of claim 3.

References Cited in the file of this patent

UNITED STATES PATENTS

| | | |
|---|---|---|
| 2,286,228 | Ripper | June 16, 1942 |
| 2,334,545 | D'Alelio | Nov. 16, 1943 |
| 2,338,637 | Gundel | Jan. 4, 1944 |
| 2,388,235 | Bowman | Nov. 6, 1945 |
| 2,407,599 | Auten | Sept. 10, 1946 |
| 2,554,475 | Suen | May 22, 1951 |
| 2,601,598 | Daniel | June 24, 1952 |
| 2,610,156 | Lundberg | Sept. 9, 1952 |
| 2,610,170 | Lundberg | Sept. 9, 1952 |
| 2,616,874 | Yost | Nov. 4, 1952 |
| 2,632,700 | Niles | Mar. 24, 1953 |
| 2,696,504 | Yost et al. | Dec. 7, 1954 |
| 2,699,435 | Auten et al. | Jan. 11, 1955 |

FOREIGN PATENTS

| | | |
|---|---|---|
| 663,736 | Great Britain | Dec. 27, 1951 |
| 232,894 | Switzerland | Sept. 16, 1944 |

OTHER REFERENCES

Auten: Paper Trade Journal, vol. 127, No. 5, pages 45–51, July 29, 1948.